United States Patent [19]
Carr

[11] Patent Number: 5,810,325
[45] Date of Patent: Sep. 22, 1998

[54] MICROVALVE

[75] Inventor: William N. Carr, Montclair, N.J.

[73] Assignee: BCAM International, Inc., Melville, N.Y.

[21] Appl. No.: 670,001

[22] Filed: Jun. 25, 1996

[51] Int. Cl.$^6$ ................................................. F16K 31/02
[52] U.S. Cl. .................................... 251/30.02; 251/30.05; 251/368; 251/129.06
[58] Field of Search .......................... 251/129.06, 129.03, 251/129.05, 368, 129.04, 30.05, 30.02, 11, 30.01

[56]      References Cited

U.S. PATENT DOCUMENTS

| 5,029,805 | 7/1991 | Albarda et al. ................. 251/129.06 X |
| 5,082,242 | 1/1992 | Bonne et al. . |
| 5,161,774 | 11/1992 | Engelsdorf et al. . |
| 5,176,358 | 1/1993 | Bonne et al. . |
| 5,180,623 | 1/1993 | Ohnstein et al. . |
| 5,238,223 | 8/1993 | Mettner et al. ................. 251/129.06 X |
| 5,417,235 | 5/1995 | Wise et al. ...................... 251/129.06 X |

FOREIGN PATENT DOCUMENTS

| 4422943 A | 1/1996 | Germany . |
| 4445686 A1 | 6/1996 | Germany . |
| 19522806 A1 | 1/1997 | Germany . |
| WO94/04832 | 1/1994 | WIPO . |

OTHER PUBLICATIONS

*Lateral In–Plane Displacement Microactuators with Combined Thermal and Electrostatic Drive*, Xi–Qing Sun, Ziaoyi Gu and W.N.Carr, Microelectronics Research Center, New Jersey Institute of Technology.
*Micromachined Silicon Microvalve*, T. Ohnstein, T. Fukiura, J. Ridley and U. Bonne, Proceedings of the IEEE, Micro Electro Mechanical Systems, 11–14 Feb. 1990, pp. 95–98.
*Electrically–Activated, Normally–Closed Diaphragm Valves*. H. Jerman. IC Sensors, Milpitas, CA, presented at a the 1991 International Conference on Solid–State Sensors and Actuators. Jun. 24–27, 1991, San Francisco, CA.
*Fabrication, Packaging and Testing of a Wafer–Bonded Microvalve*, Michael A. Huff and Martin A. Schmidt, Proceedings of the IEEE, Solid State Sensor and Actuator Workshop, Jun., 1992, pp. 194–197.
*Electrostatically–Actuated Gas Valve with Large Conductance*, M. Shikida, K. Sato, S. Tanaka, Y. Kawamura, and Y. Fujisaki, presented at The 7th International Conference on Solid–State Sensors and Actuators, Jun. 7–10, 1995 Yokohama, Japan.

(List continued on next page.)

*Primary Examiner*—Kevin Lee
*Attorney, Agent, or Firm*—Snell & Wilmer, L.L.P.

[57]      ABSTRACT

A microvalve incorporating the invention includes a valve plate with a planar base and an extending pedestal, the pedestal having an upper valve surface. The planar base is enclosed by a rim which creates a valve recess between the rim and the pedestal. A cover plate is sealed to the rim and includes an outlet which is sealed by engagement with the valve surface of the pedestal. A support plate includes an enclosing rim that is sealed to a lower surface of the valve plate and creates a reference pressure enclosure. Both the support plate and valve plate are comprised of semiconductor material. A substrate is sealed to a lower surface of the support plate and creates a pressure recess between the substrate and the lower surface. A pump feeds a compressible fluid into both the valve recess and the pressure recess via a reference control subvalve positioned in a pathway between the reference pressure enclosure and the pressure recess. A control circuit opens the reference pressure valve to enable establishment of a reference pressure in the reference pressure enclosure; thereafter closes the reference pressure valve so that when pressure in the valve recess exceeds the reference pressure by a threshold level, the valve plate and pedestal are moved downwardly, allowing fluid flow out of the valve recess and through the fluid outlet. The control circuit further opens the reference subvalve to enable reestablishment of the reference pressure in the reference pressure enclosure, before a next pump cycle. A high voltage semiconductor circuit is shown which actuates the reference subvalve in accordance with control signals.

18 Claims, 5 Drawing Sheets

OTHER PUBLICATIONS

*On–Chip Integration of High–Voltage Generator Circuits for an Electrostatic Micromotor*, Hong Jiang and William N. Carr, Microelectronics Research Center, New Jersey Institute of Technology, presented at The 8th International Conference on Solid–State Sensors and Actuators and Eurosensors IX, Jun. 25–29, 1995 Stockholm, Sweden.

*Self–Excited Piezoelectric Cantilever Oscillators*, S. Lee and R. White. Berkeley Sensor and Actuator Center, presented at The 8th International Conference on Solid–State Sensors and Actuators and Eurosensors IX. Jun. 25–29, 1995 Stockholm, Sweden.

*Minimum Detectable Force Gradients of Piezoelectric Microcantilever*, T. Itoh and T. Suga. Research Center for Advanced Science and Technology, University of Tokyo, Japan, IPO Publishing Ltd., 1995, pp. 231–236.

*Fabrication of an S–shaped Microactuator*, M. Shikida, Kazuo Sato and TAkeshi Harada, Journal of Microelectromechanical Systems, vol. 6, No. 1, Mar. 1997.

*A Novel Micromachined Pump Based On Thick–Film Piezoelectric Actuation*, Michael Koch, Nick Harris, Alan G.R. Evans, Neil M. White and Arthur Brunnschweiler, Transducers '97, 1997 International Conference on Solid–State Sensors and Actuators, Chicago, Jun. 16–19, 1997.

*Long–Term Performance Analysis of Thermo–Pneumatic Micropump Actuators*, W.K. Schomburg, R. Ahrens, W. Bacher, S. Engemann, P. Krehl, J. Martin, Transducers '97, 1997 International Conference on Solid–State Sensors and Actuators, Chicago, Jun. 16–19, 1997.

*Latched Valve Manifolds for Efficient Control of Pneumatically Actuated Valve Arrays*, Jeffrey Y. Pan, Ph.D., Donald VerLee, Mehran Mehregany, Ph.D., Transducers '97, 1997 International Conference on Solid–State Sensors and Actuators, Chicago, Jun. 16–19, 1997.

*Electromagnetically Driven Microvalve Fabricated in Silicon*, Andreas Meckes, Jorg Behrens and Wolfgang Benecke, Transducers '97, 1997 International Conference on Solid–State Sensors and Actuators, Chicago, Jun. 16–19, 1997.

*Fabrication and testing of an ink–jet head based on buckling behavior*, Susumu Hirata, Shingo Abe, Yorishige Ishii, Hirotsugu Matoba, Tetsuya Inui, 1995 Engineering Information, Inc., Hoboken, New Jersey.

*Bimetallic thermally actuated micropump*, Yue Yang, Zhaoying Zhou, Xiongying Ye, Xiaoning Jiang, 1995 Engineering Information, Inc., Hoboken, New Jersey.

*Silicon Membrane micropump with integrated bimetallic actuator*, Changqing Zhan, Taichin Lo, Litian Liu, Peihsin Tsien, 1995 Engineering Information, Inc., Hoboken, New Jersey.

*Release–control structure for post–process release of a micromachined caNtilever*, S. Naseh, L.M. Landsberger, M. Paranjape, B. Nikpour, M. Kahrizi, R. Antaki, J.F. Currie, 1995 Engineering Information, Inc., Hoboken, New Jersey.

*Invitation To Pay Additional Fees*, International Searching Authority, Oct. 10, 1997.

FIG-11

MICROVALVE

FIELD OF THE INVENTION

This invention relates to microvalves and, more particularly, to an improved differential pressure micromachined silicon-based microvalve which provides for precise control of a reference pressure against which an operational pressure works.

BACKGROUND OF THE INVENTION

Pressure-balanced microvalves are known in the prior art. Huff, et al. in "Fabrication, Packaging and Testing of a Wafer-Bonded Microvalve" Proceedings of the IEEE, Solid State Sensor and Actuator Workshop, June, 1992, pp. 194–197, disclose a pressure-balanced microvalve. Therein, the moving part of the valve is a plunger which is actuated vertically and comprises a center-bossed circular base and cap. Fluid pressure produces an upward-directed force on the underside of the plunger cap and tends to close the valve, while simultaneously, a downward directed force on an annular plate supporting the plunger tends to open the valve. The total force necessary to actuate the valve is derived from the difference of pressures on either side of an actuation diaphragm.

Huff, et al. apply a negative pressure to the back side of the valve plunger. When that negative pressure is sufficient to overcome the bending stiffness of the center-bossed plunger plate, the plunger moves downward and opens the valve. Huff, et al. provide little teaching regarding control of the negative pressure, other than indicating that it is supplied via a vacuum line.

Ohnstein, et al. in "Micromachined Silicon Microvalve", Proc. IEEE Micro Electro Mechanical Systems, 11–14 Feb. 1990, pps. 95–98, disclose a microvalve which converts an electric signal to a pneumatic signal for pressure or gas flow control. The microvalve consists of a silicon substrate with an opening over which a dielectric closure plate is positioned. The closure plate includes an electrode plate, as does a valve seat over which the closure plate resides. The closure plate is normally open and when a voltage is applied between the respective electrode plates, electrostatic forces between the plates pulls the closure plate against the valve seat and shuts off flow through the opening.

In order to assure accurate control of the operation of a differential pressure microvalve, it is critical that the reference pressure, against which the operational pressure works, is accurately controlled. Otherwise, valve failure can occur or the valve will open/close at pressures other than those within the preferred design range. Further, the utilization of a separate negative pressure source to achieve a reference pressure in the microvalve installation is not needed.

Accordingly, there exists a long felt need for an improved differential pressure microvalve wherein highly accurate reference pressure control is achieved. Moreover, there is a long felt need for a microvalve that is adapted for use with a fluid flow which exhibits intermittent pressure pulses.

SUMMARY OF THE INVENTION

While the way in which the present invention addresses the various disadvantages of prior art microvalves will be described in greater detail hereinbelow, in general, an improved differential pressure microvalve is provided wherein the pressure is derived from a pump source and is passed through a subvalve which communicates with the microvalve.

In accordance with various aspects of the present invention, a microvalve incorporating the invention includes a valve plate with a substantially planar base and an extending pedestal, the pedestal having an upper valve surface. The base is enclosed by a rim which creates a valve recess between the rim and the pedestal. A cover plate is sealed to the rim and includes an outlet which is sealed by engagement with the valve surface of the pedestal. A support plate includes an enclosing rim that is sealed to a lower surface of the valve plate and creates a reference pressure enclosure. Both the support plate and valve plate are preferably comprised of semiconductor material. A substrate is sealed to a lower surface of the support plate and creates a pressure recess between the substrate and the lower surface. A pump feeds a compressible fluid into both the valve recess and the pressure recess via a reference control subvalve positioned in a pathway between the reference pressure enclosure and the pressure recess. A control circuit opens the reference pressure valve to enable establishment of a reference pressure in the reference pressure enclosure; thereafter closes the reference pressure valve so that when pressure in the valve recess exceeds the reference pressure by a threshold level, the valve plate and pedestal are moved downwardly, allowing fluid flow out of the valve recess and through the fluid outlet. The control circuit further opens the reference subvalve to enable reestablishment of the reference pressure in the reference pressure enclosure, before a next pump cycle. A high voltage semiconductor circuit is shown which actuates the reference subvalve in accordance with control signals. The microvalve is also usable as a bleeder valve.

BRIEF DESCRIPTION OF THE DRAWINGS

The present invention will be hereinafter described in conjunction with the appended drawing figures, wherein like designations denote like elements, and.

DETAILED DESCRIPTION OF PREFERRED EXEMPLARY EMBODIMENTS

Figure 1A:
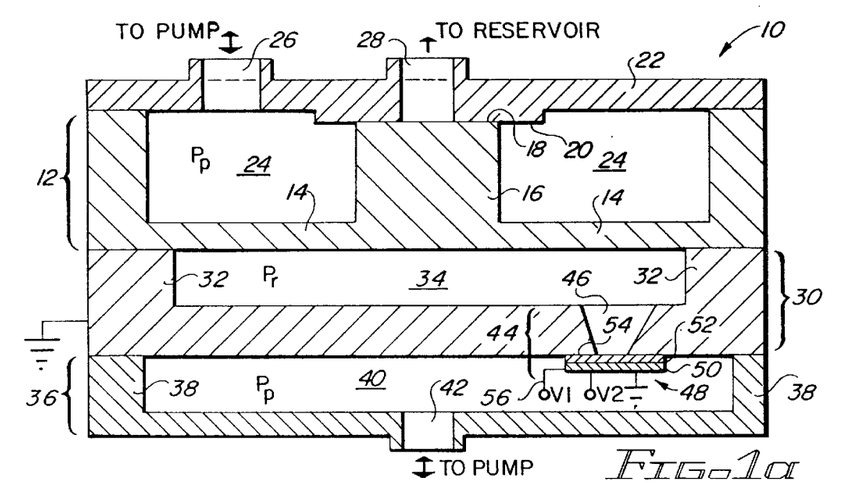
FIGS. 1a–1c illustrate sectional views of a microvalve incorporating the invention, at three different times during an operational cycle thereof.

Referring to FIG. 1a, a sectional view is shown of a microvalve 10 which incorporates the invention. Microvalve 10 includes a valve plate 12 comprising a planar base region 14 from which a central pedestal 16 extends upwardly. An uppermost valve surface 18 of pedestal 16 interacts with underside surface 20 of cover plate 22 to close/open orifice 28. Valve plate 12 is constructed from a single crystalline silicon slab which is anisotropically etched to form pedestal 16 and valve recesses 24.

Microvalve 10 is preferably constructed in a cylindrical form so that valve recesses 24 comprise an annulus surrounding pedestal 16. An inlet orifice 26 in cover plate 22 communicates with a pump and enables an inflow of a compressible fluid (e.g. air) into valve recesses 24. An outlet orifice 28, formed centrally in cover plate 22, enables an outflow of the compressible fluid when pedestal 16 is drawn downwardly, disengaging valve surface 18 from under surface 20 of cover plate 22.

A support plate 30 (also preferably formed from a single crystalline slab of silicon) includes an enclosing rim 32. When the uppermost surfaces of rim 32 are bonded to the lower surface of valve plate 12, a reference pressure enclosure 34 is formed.

A substrate 36 includes a continuous rim 38 which is bonded to the lower surface of support plate 30. Substrate 36 may be made of any appropriate fluid-impervious material and need not be comprised of a semiconductor. The recess region within substrate 36 forms a pressure chamber 40. Pressure chamber 40 is charged by a flow of pressurized fluid through orifice 42 from the pump. Reference pressure enclosure 34 and pressure chamber 40 are connected by a reference pressure control subvalve 44 which includes an orifice 46 and a cantilevered closure plate 48.

Closure plate 48, in a preferred embodiment, is normally open and preferably comprises a bimorph configuration including at least a first layer 50 and a second layer 52, wherein layers 50 and 52 are selected from materials having different thermal coefficients of expansion. In accordance with a preferred aspect of the present invention, layer 50 comprises a conductive polysilicon material which is bonded to layer 52 which comprises an oxide insulating material. Preferably, oxide insulating layer 52 is, in turn, bonded at point 54 to the underside of support plate 30. Closure plate 48 is actuated by a combination of thermal and electrostatic actuations.

Figure 1B:
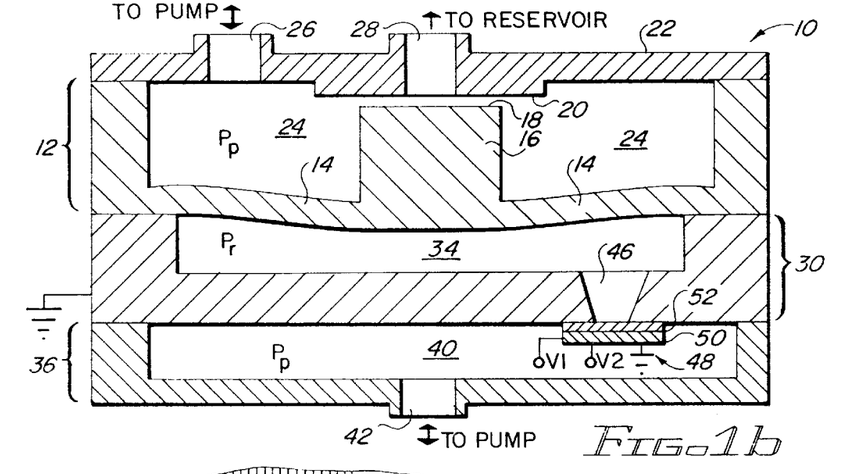
Figure 1C:
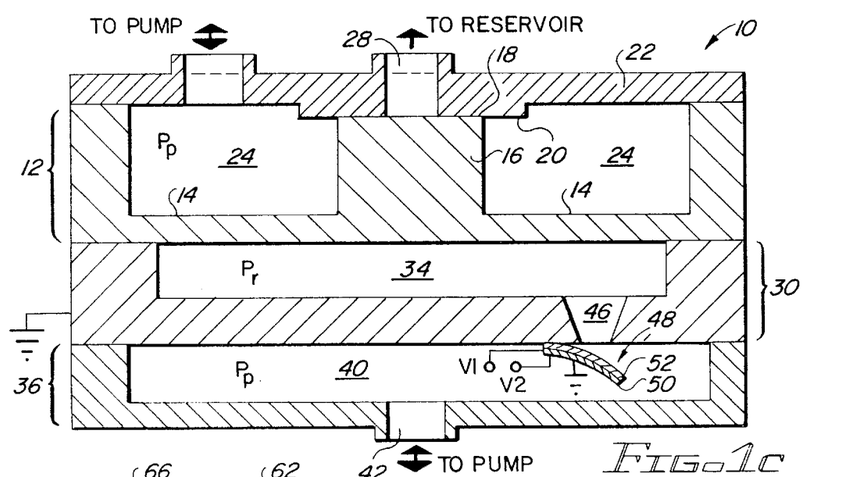
Figure 1D:
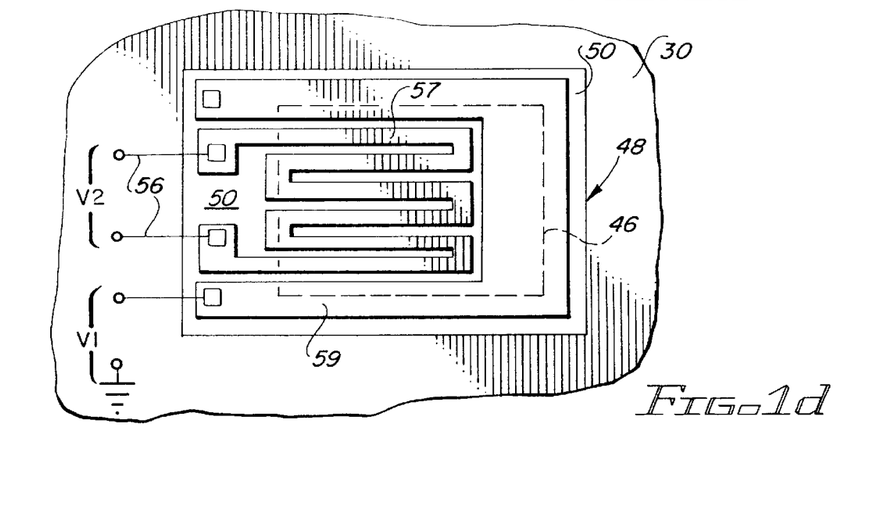
FIG. 1d is a plan view of a closure plate portion of a subvalve used in the microvalve of FIGS. 1a–1c.

With reference to FIG. 1d, a voltage V2 is applied via conductors 56 to a resistance 57 which is diffused into polysilicon layer 52. Voltage V2 causes a current flow through resistance 57, a heating thereof and a resultant heating of layer 50 and layer 52. In that layers 50 and 52 are chosen to have different coefficients of thermal expansion, when voltage V2 is not applied, closure plate 48 is bent to open the lowermost aperture of orifice 46. By contrast, when voltage V2 is applied, the heating action induced by diffused resistance 57 causes a differential expansion between layers 50 and 52, thereby causing a counterclockwise rotation of closure plate 48 about point 54, until the lowermost aperture of orifice 46 is closed.

Further, a voltage V1 is applied to a conductive region 59 that is diffused into layer 50. Since support plate 30 is grounded, voltage V1 creates an electrostatic attraction between layer 50 and support plate 30, thereby improving the closure action of closure plate 48. Thereafter, the heating current through resistance 57 can be removed, and the electrostatic attraction exerted by voltage V1 will continue to maintain closure plate 48 in its closed position.

A less preferred embodiment of closure plate 48 is a normally closed configuration, wherein layer 50, for example, comprises an oxide or similar material layer and layer 52, for example comprises a polysilicon or similar material layer. Under such a configuration, application of voltage V2 causes an opening of closure plate 48 and voltage V1 is used to provide an electrostatic closure action. Closure plate 48 is opened by turning on voltage V2 and turning off Voltage V1. Because the thermal actuating power is much higher than the electrostatic closure power, this embodiment tends to consume substantially greater levels of power than the preferred embodiment.

Figure 2:
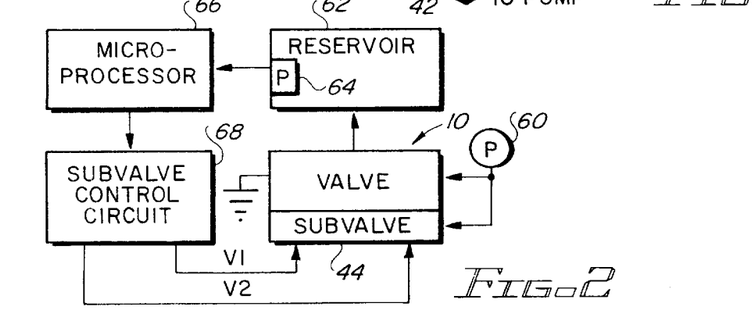
FIG. 2 is a block diagram of a system incorporating the microvalve of FIGS. 1a–1c.

FIG. 2 illustrates a pressurization system which employs microvalve 10. As indicated above, microvalve 10 is a differential pressure valve wherein the differential pressure is derived from a single pressure source, e.g., a pump 60. Assuming pump 60 is a pulsatile air pump, valve 10 provides pulsed flows of air to reservoir 62. A pressure sensor 64 measures the pressure within reservoir 62 and provides an electrical indication thereof to microprocessor 66. In turn, microprocessor 66 provides control signals to subvalve control circuit 68 which, in turn, controls the application of voltages V1 and V2 to reference pressure control subvalve 44.

Figure 3:
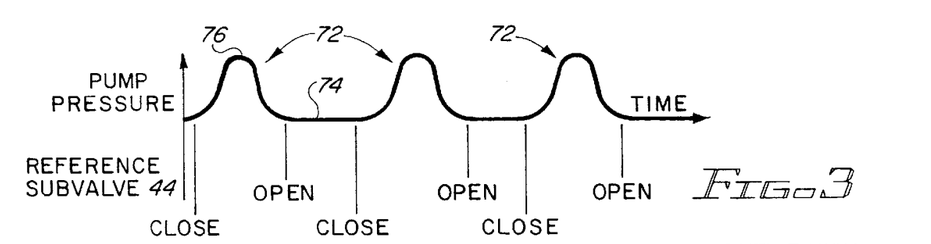
FIG. 3 is a chart illustrating succeeding pump pressure cycles and concurrent states of a reference pressure control subvalve in the microvalve.

FIG. 3 charts the periodic pressure pulses 72 from pump 60. Each pressure pulse 72 transitions from a low pressure 74 to a high pressure 76 and vice-versa. Preferably, the low pressure 74 is atmospheric. During each cycle of pump 60, reference pressure control subvalve 44 is maintained in a closed position whereas when the output from pump 60 is at low pressure level 74, reference pressure control subvalve 44 is opened so as to equalize the reference pressure in reference pressure enclosure 34. Further, as will be understood from the discussion below, the low pressure period between pulses 72 can be used to bleed off pressure from reservoir 62.

Returning to FIGS. 1a–1c, a preferred sequence of operations of microvalve 10 will now be described in conjunction with the chart of FIG. 2 and FIG. 3. Turning first to FIG. 1a, assume that the output from pump 60 is at low pressure level 74, and that microprocessor 66 has caused subvalve control circuit 68 to apply voltage V1 to reference pressure control subvalve 44. As a result, closure plate 48 is rotated counterclockwise to the closed position and is held in that position by continued application of voltage V1 and the electrostatic attraction created as a result of the difference in potentials between voltage V1 and voltage V2.

Assume further that the air pressure Pr within reference pressure enclosure 34 is at low pressure level 74. Further, since the output from pump 60 is also at low pressure level 74, pressure Pp in valve recess 24 is at low pressure level 74. Under such conditions, base 14 of valve plate 12 holds the valve surface 18 of pedestal 16 against undersurface 20 of cover plate 22. As a result, outlet 28 to reservoir 62 is sealed, thus maintaining the pressure state within reservoir 62. Note further that pressure Pp within pressure chamber 40 is also at low level 74 (as a result of the feed from pump 60 through inlet 42.)

Assume now that pump 60 outputs an air pulse 72 that is fed to valve recess 24, increasing pressure Pp therein. Since the pressure within reference pressure enclosure 34 still remains at low pressure level 74, the pressure differential between Pp and Pr causes a downward flexure (see FIG. 1b) of base 14. The resulting downward movement of pedestal 16 removes valve surface 18 from lower surface 20 and opens an airway between valve recess 24, via outlet 28, to reservoir 62. As a result, pressurized air is fed from valve recess 24 to reservoir 62.

At the same time that the air pulse is being applied to valve recess 24, the air pulse is also applied to pressure chamber 40, thereby helping to maintain closure plate 48 in a closed position (due to the differential pressure between Pp and Pr). Notwithstanding the multiple closure forces on closure plate 48, some air leakage may still result into reference pressure enclosure 34 from pressure chamber 40. This action causes an increase in Pr which, if not corrected, can cause a deterioration in the operation of microvalve 10. In those cases where leakage does not occur, as will be appreciated, it may be possible to configure microprocessor 66 such that, for example, during inflation, subvalve 44 is not repeatedly opened and closed during inflation.

However, in those cases where leakage may or does occur, during the time that the output from pump 60 is at low pressure level 74 (see FIG. 1c), microprocessor 66 preferably causes subvalve control circuit 68 to remove voltage V1 from closure plate 48. That action causes closure plate 48 to rotate in a clockwise direction (as a result of the different thermal coefficients of expansion between oxide layer 52 and polysilicon layer 50), thus opening orifice 46. Since pressure Pp is at low pressure level 74, any over-pressure within reference pressure enclosure 34 is released and reference pressure Pr is reestablished at low pressure level 74.

Since pressure Pp in valve recess 24 and pressure Pr in reference pressure enclosure 34 are now the same, base 14 returns to its non-stressed position, causing valve surface 18 of pedestal 16 to come into contact with lower surface 20 of cover plate 22. As a result, reservoir 62 is sealed until a next high pressure air pulse from pump 60.

Microprocessor 66 receives a measure of the pressure within reservoir 62 from pressure sensor 64. If the pressure within reservoir 62 rises past a desired threshold level, microprocessor 66 causes an earlier opening of reference pressure control subvalve 44 so as to cause an earlier reduction in pressure within reference pressure enclosure 34. The over-pressure within reservoir 62 is thus enabled (earlier than otherwise) to push down on valve surface 18, causing it to move away from lower surface 20 of cover plate 22. As a result, the over pressure is vented into valve recess 24. In addition there is a small leakage past valve surface 18 which vents overpressure.

If it is determined that insufficient over pressure venting occurs from the aforesaid action, a bleed valve can be coupled to reservoir 62 and controlled by microprocessor 66 in accordance with outputs from pressure sensor 64. A bleed valve constructed in accordance with the invention will be described below in relation to FIG. 8.

Figure 4:
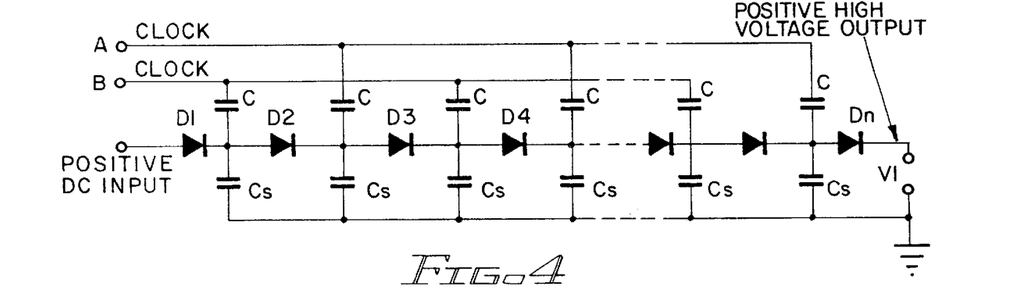
FIG. 4 is a circuit diagram of a voltage multiplier circuit that is used to operate the reference pressure control subvalve used in the microvalve.
Figure 5:
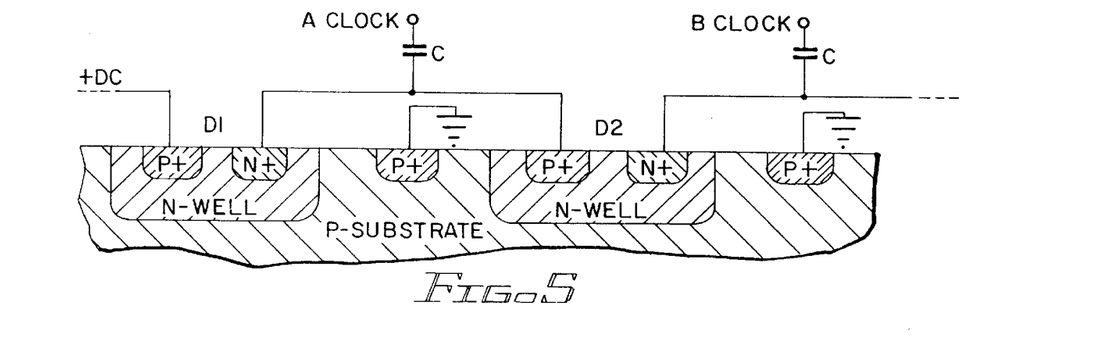
FIG. 5 illustrates a semiconductor structure that incorporates the circuit of FIG. 4.

In accordance with a preferred aspect of the present invention, voltage V2 is sufficiently high to create a current flow in polysilicon layer 50 which causes a heating thereof and results in a counterclockwise flexure of closure plate 48. Further, voltage V1 should be sufficiently high that a substantial level of electrostatic attraction occurs across layer 52, to support plate 30 which is maintained at ground potential. To enable the generation of voltage V1, without requiring the presence of a high voltage power supply, the voltage multiplier circuit shown in FIGS. 4 and 5 is utilized.

Conventional voltage multiplier circuits typically employ capacitor/diode networks which convert an AC sine wave input voltage into a DC output voltage. Such voltage multiplier circuits are difficult to configure in a monolithic integrated circuit. The circuit shown in FIGS. 4 and 5 is easily integrated and provides a positive high voltage output that is on the order of 10 times the input DC voltage level.

The voltage multiplier circuit comprises a plurality of series connected diodes D1–Dn, wherein alternate diodes are controlled, in parallel, from two non-overlapping clock input signals A and B. Each clock signal is coupled to a respective diode-to-diode junction through a capacitor C. Further, each diode-to-diode connection includes a capacitance Cs which comprises the capacitance between one terminal of the diode and a substrate into which the diode is integrated. This structure will be better understood by referring to FIG. 5.

Initially, it is to be understood that the doping states of the various diode contacts and substrate are illustrated for a positive DC input. If a negative DC input is used, the doping and diode orientations would need to be altered accordingly. Each diode pn junction comprises p+ and n+ diffusions into an encompassing n-well structure. The n-well structure is further configured in p-doped substrate which supports the entire voltage multiplier circuit. Isolation p+ diffusions are used to separate the individual diode structures. Each n-well is essentially floating but is reverse biased from the p-doped substrate by the voltage applied to each p+ diode contact.

It is the reverse bias between the n-well and the p substrate which forms a depletion region that manifests capacitance Cs. The normal breakdown voltage for such a structure approximates 50 volts, thereby enabling an input 5 volt DC value to be multiplied by almost ten times without overcoming the breakdown potential.

In operation, a positive DC input is applied to diode D1 causing a charging of the n-well/P substrate capacitance. Assuming that the input voltage is 5 volts DC, an approximate 5 volt charge results. Thereafter, when the A clock signal is applied, diode D1 becomes conductive and enables discharge of the accumulated charge through the n+ terminal to diode D2, causing a charging of its n-well/p substrate capacitance.

Since the B clock signal is non-overlapping, diode D2 acquires the charge from diode D1 and does not pass it on to diode D3 until the B clock occurs. At each succeeding clock cycle, the charge from the previous diode is transferred and added to the charge in the next succeeding diode in the multiplier circuit. In such manner, the charge state passed along between succeeding diodes increases in accordance with the charge additions which occur during intervening clock cycles. A voltage multiplication results at the circuit output. Voltage output V1 is, however limited by the charging time, the clock rate, the supply voltages and the leakage current of the reverse-biased pn junction diodes.

Figure 6:
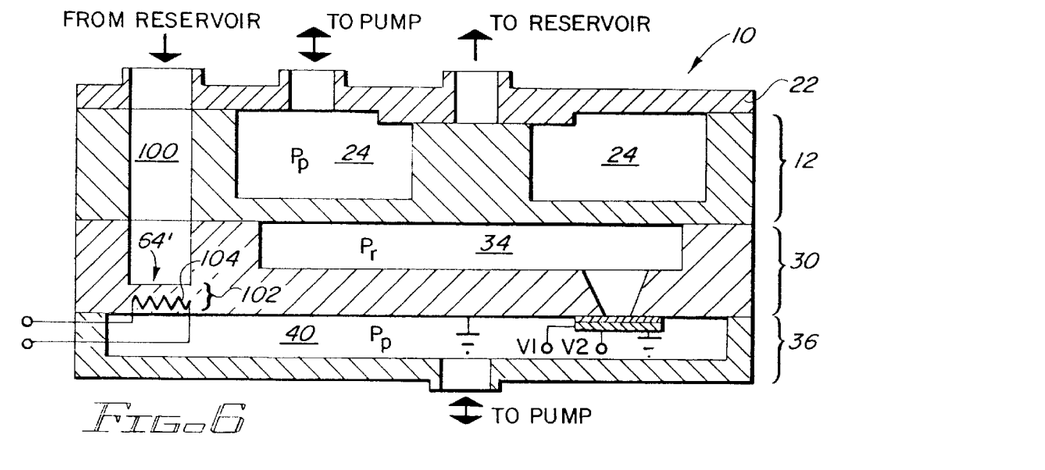
FIG. 6 is a sectional view of a further embodiment of the microvalve which incorporates a reservoir pressure measurement feature.

Referring back, briefly, to FIG. 2, pressure sensor 64 is shown positioned in reservoir 62. Pressure sensor 64, however, can be integrated directly into microvalve 10, as shown in FIG. 6. To accomplish such integration, microvalve 10 is modified to include a channel 100 which communicates with reservoir 62 and passes through cover plate 22, valve plate 12 and into support plate 30. A relatively thin region 102 remains between channel 100 and pressure chamber 40. A piezoresistive element 104 may be configured on either the upper or lower surface of region 102 and connected to a bridge circuit, so as to evidence pressure differences between channel 100 and pressure chamber 40. In such manner, the relative pressure differential between the reservoir pressure and pressure chamber 40 can be readily determined and the need for an independent pressure sensor in reservoir 62 is avoided.

Figure 7:
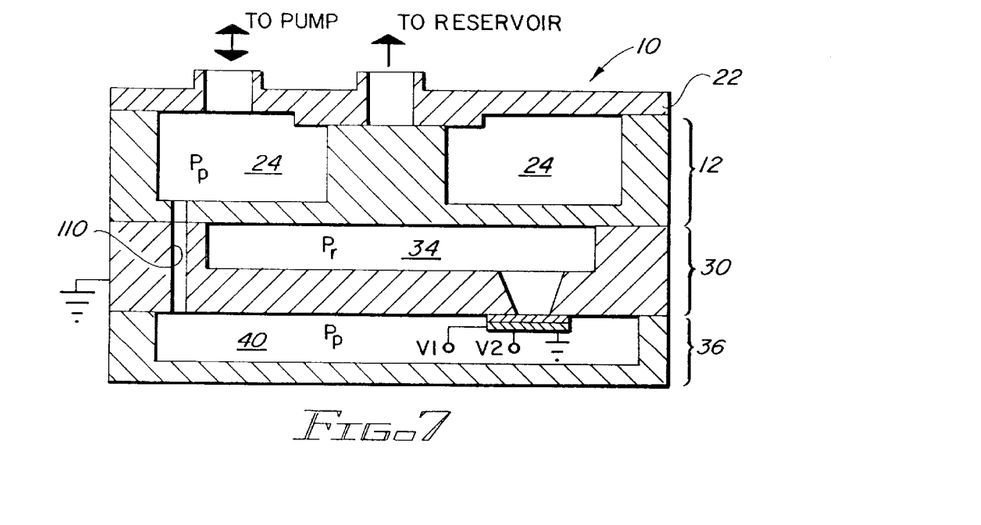
FIG. 7 is a sectional view of a further embodiment of the microvalve wherein a pressure recess region used to provide a supply of pressurized fluid for the reference pressure enclosure is fed directly from a valve recess in the microvalve.

Turning to FIG. 7, the structure of microvalve 10 has been modified by removal of inlet 42 to pressure chamber 40, eliminating a need for dual connections from pump 60. The pressure supplied to pressure chamber 40 is obtained via channel 110 which extends from valve recess 24 through support plate 30, into pressure chamber 40.

Figure 8:
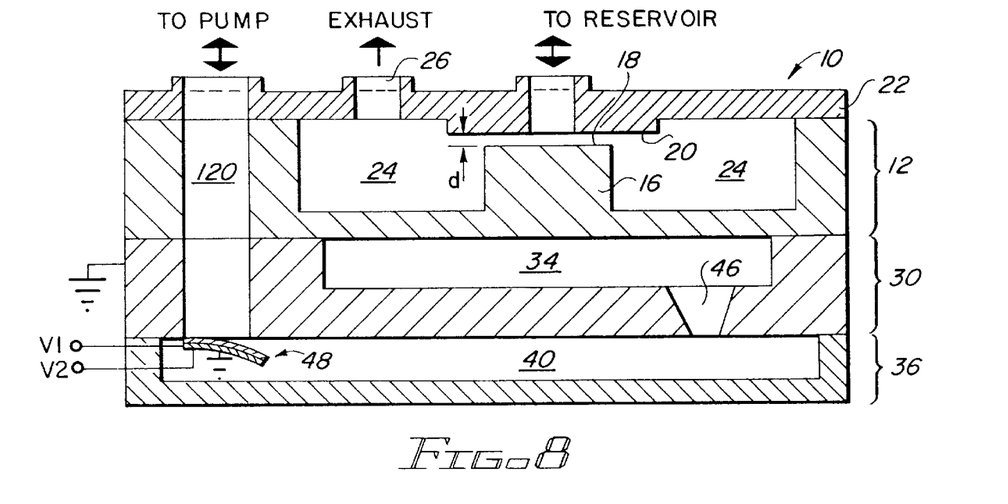
FIG. 8 is a sectional view of a microvalve which is employed as a bleeder valve.

In FIG. 8, a version of microvalve 10 is shown which is usable as a bleeder valve. A number of modifications to microvalve 10 are required in order to convert its operation to the bleeder function. First, the height of pedestal 16 is reduced so that if the pressure differential between valve recess 24 and reference pressure enclosure 34 is less than a threshold value, then a distance d is maintained between valve surface 18 and undersurface 20 of cover plate 22. Thus, microvalve 10 is converted to a normally open microvalve, from the normally closed microvalve described above. Orifice 26, instead of being connected to pump 60, is connected as an exhaust opening.

A channel 120 runs from the upper surface of cover plate 22, down through valve plate 12, support plate 30 and opens into pressure chamber 40. Closure plate 48 is moved from orifice 46 and acts as a closure at the bottom extent of channel 120. The uppermost extent of channel 120 is connected to pump 60.

As will be recalled, at times it may be necessary to vent reservoir 62 in the case of an overpressure condition therein. The microvalve of FIG. 8 can be used to accomplish such a venting action. To close microvalve 10, closure plate 48 is opened, enabling a high pressure air pulse 72 from pump 60 to enter pressure chamber 40 and, via orifice 46, into reference pressure enclosure 34. As pressure pulse 72 (see FIG. 3) approaches high pressure level 76, voltage V1 is applied to closure plate 48, enabling it to close. A high pressure state is thus created in reference pressure enclosure 34 and causes an upward extension of pedestal 16. As a result, valve surface 18 seals to lower surface 20 of cover plate 22.

When a venting action is thereafter desired, voltage V1 is removed from cover plate 48 during a low pressure output period from pump 60. Cover plate 48 thus rotates in a clockwise direction into an open position. As a result, the high pressure air within pressure chamber 40 and reference pressure enclosure 34 is enabled to vent through channel 120. Upon the resulting fall of pressure within reference pressure enclosure 34, the differential pressure which holds valve surface 18 in contact with lower surface 20 is released, and pedestal 16 moves by a distance d to open the channel between reservoir 62 and exhaust orifice 26.

Figure 9:
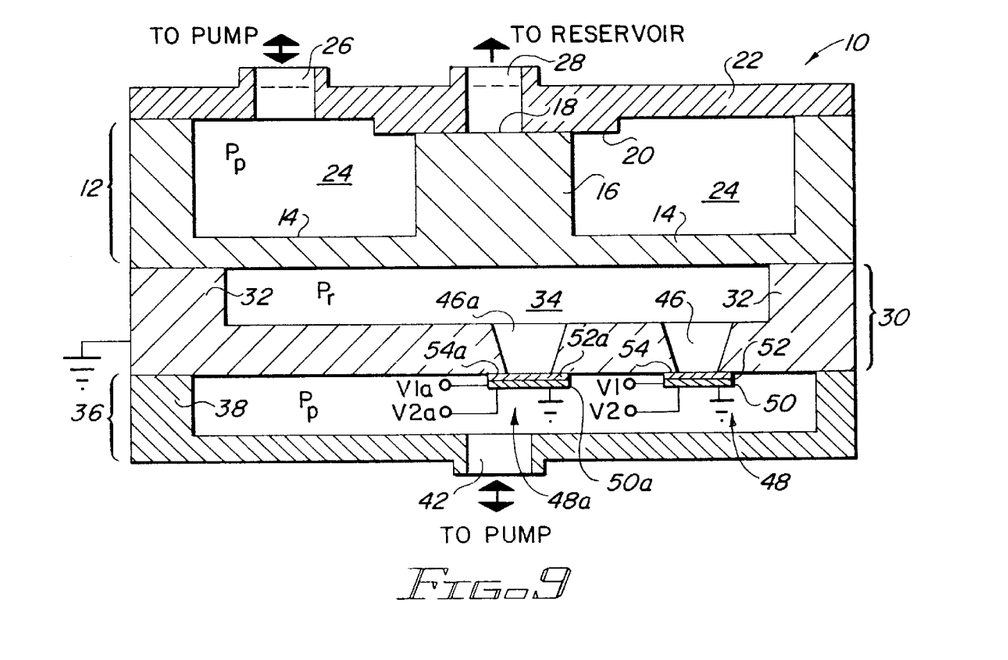
FIG. 9 is a sectional view of a microvalve incorporating a further embodiment of the present invention.

With reference to FIG. 9, a further embodiment of a microvalve in accordance with the present invention is illustrated which includes more than one subvalve in place of subvalve 46 of microvalve 10. For example, as is illustrated, microvalve 10 may include two or more subvalves 46a, 46b, etc. to facilitate fluid communication from the pump to enclosure 34. In accordance with this embodiment a second subvalve 46a is provided adjacent subvalve 46. Subvalve 46a, like subvalve 46, preferably comprises an opening having generally tapered sidewalls and is sealed by a closure plate 48 preferably comprising respective layers 50a and 52a.

In accordance with various aspects of the present invention, the shape and configuration of subvalves 46 and 46a (and/or additional subvalves 46n, if desired) are selected to maximize fluid conductance from the pump to enclosure 34. For example, while it is believed that the substantially tapered sidewall configuration of subvalves 46 and 46a contributes favorably to such fluid conductance, other configurations which are now known or hereafter devised by those skilled in the art to accomplish such a purpose may be employed in the context of the present invention.

Figure 10:
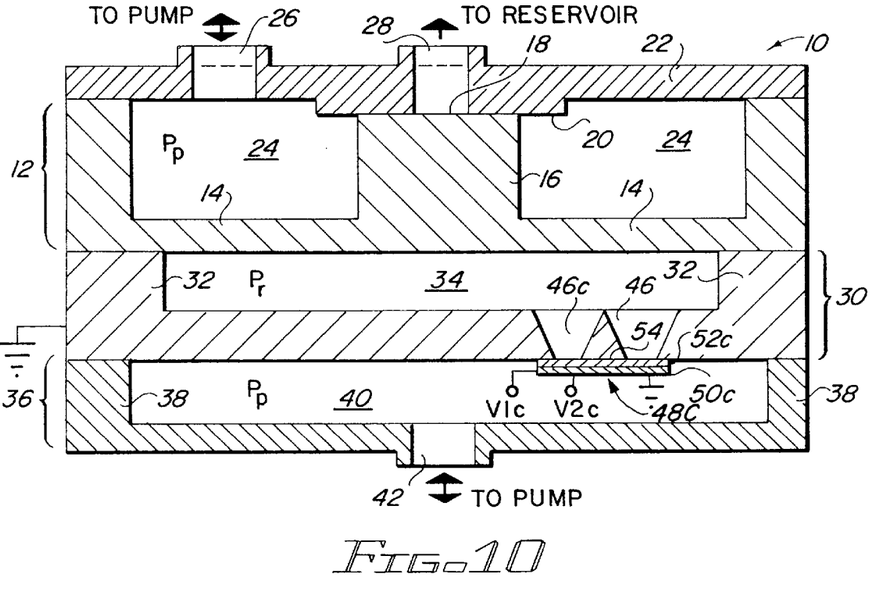
FIG. 10 is a sectional view of a microvalve incorporating still a further embodiment of the present invention.
Figure 11:
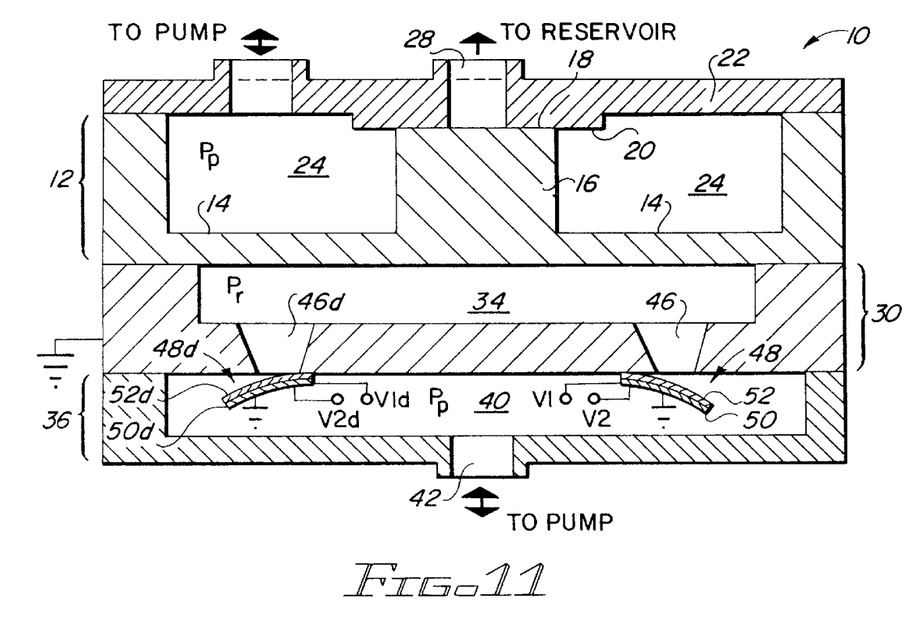
FIG. 11 is a sectional view of a microvalve incorporating yet another embodiment of the present invention.

Referring now to FIG. 10, in accordance with yet another embodiment of the present invention, multiple subvalves 46 and 46a may be sealed by a single closure plate 48c which includes respective layers 50c and 52c. Alternatively, in lieu of a single closure plate, multiple closure plates may be utilized similar to the embodiment illustrated in FIG. 9, but which closure plates are suitably configured such that thermal and electrostatic actuations cause, for example, a counter clockwise rotation of one closure plate and a clockwise rotation of another closure plate. For example, with reference to FIG. 11, still a further embodiment of the present invention is illustrated wherein a further subvalve 46d is positioned in spaced relationship to subvalve 46 and a closure plate 48d is configured such that a clockwise rotation thereof is effected to enable closure plate 48d to be urged into substantial mating juxtaposition with the lowermost portion of support plate 30 to substantially seal subvalve 46d. As will be appreciated, various other subvalve and closure plate configurations are available to enable fluid communication between the pump and enclosure 34; these other configurations as are now known or hereafter devised by those skilled in the art may be employed in the context of the present invention.

It should be understood that the foregoing description is only illustrative of preferred embodiments of the invention. Various alternatives and modifications can be devised by those skilled in the art without departing from the invention. Accordingly, the present invention is intended to embrace all such alternatives, modifications and variances which fall within the scope of the appended claims.

We claim:

1. A microvalve for feeding a compressible fluid from a pump to a reservoir, comprising:

a valve plate comprised of a semiconductor material and including a planar base with an extending pedestal positioned on an upper surface thereof, said pedestal having a valve surface, said planar base including a rim and a valve recess formed between said rim and said pedestal;

a cover plate sealed to said rim, including an outlet for communicating with said reservoir, said outlet sealed by engagement with said valve surface of said pedestal;

support plate means comprised of a semiconductor material and including a reference pressure enclosure in communication with a lower surface of said valve plate;

substrate means juxtaposed to a lower surface of said support plate means and including a pressure chamber;

means for feeding said compressible fluid from said pump into both said valve recess and said pressure chamber;

valve means positioned in communication between said reference pressure enclosure and said pressure chamber; and control means for (i) opening said valve means to enable establishment of a reference pressure in said reference pressure enclosure from said pressure chamber, and (ii) thereafter closing said valve means so that when pressure of said compressible fluid in said valve recess exceeds said reference pressure by a threshold level, said valve plate and pedestal move downwardly, allowing fluid flow out of said valve recess and through said outlet in said cover plate, and (iii) further opening said valve means to enable reestablishment of said reference pressure in said reference pressure enclosure before a next pump cycle.

2. The microvalve as recited in claim 1, wherein said valve means comprises a passageway positioned in said support plate means, and a bimorphic plate for selectively opening and closing said passageway in response to signals from said control means.

3. The microvalve as recited in claim 2, wherein said bimorphic plate comprises at least semiconductor layer and an insulating layer, said insulating layer juxtaposed to said passageway and exhibiting a coefficient of thermal expansion that is different from a coefficient of thermal expansion of said semiconductor layer, said control means applying a first voltage to said bimorphic plate to cause said plate to heat and to deform to close said passageway and applying a second voltage to said support plate means which, in combination with said first voltage, causes an electrostatic attraction of said bimorphic plate to said support plate means.

4. The microvalve as recited in claim 1, wherein said pump provides pulsed flows of said compressible fluid to said valve recess and said pressure chamber, and said control means enables an opening of said valve means primarily during intervals between said pulsed flows.

5. The microvalve as recited in claim 3, wherein said control means includes a high voltage generator for producing said first voltage, said high voltage generator comprising:

a semiconductor substrate of first conductivity type;

a plurality of second conductivity type wells formed in said semiconductor substrate;

a pn junction formed in each second type conductivity type well;

means for applying a bias between said semiconductor substrate and each second conductivity type well to create a depletion layer therebetween and thus, a capacitor between said pn junction and said substrate;

circuit means for connecting each said pn junction into a series circuit between an input and an output, said input having a source of dc potential connected thereto; and clock means for sequentially causing each said pn junction to be rendered conductive so as to conduct a charge present in an associated capacitor in said second conductivity type well to a next capacitor in a second conductivity type well that is in said series circuit, said clock means thereby causing a successive addition of charge at each succeeding pn junction and at said output.

6. The microvalve as recited in claim 1, wherein said support plate further comprises:

an opening which manifests a pressure level present in said reservoir;

pressure sensing means positioned between said opening and said pressure chamber, whereby a difference in pressure between said pressure chamber and said pressure level present in said reservoir causes a flexure of said pressure sensing means and a change of electrical characteristics thereof; and means for sensing said change of said electrical characteristics as an indication of said reservoir pressure.

7. The microvalve as recited in claim 1, wherein said means for feeding comprises an opening through said cover plate and an opening through said substrate, both openings communicating with said pump.

8. The microvalve as recited in claim 1, wherein a passageway communicates between said valve recess and said pressure chamber and said means for feeding comprises an opening through said cover plate, whereby said compressible fluid is pumped by said pump into said valve recess and from thence via said passageway into said pressure chamber.

9. The microvalve as recited in claim 1, wherein said compressible fluid is air.

10. A microvalve for bleeding a compressible fluid from a reservoir, comprising:

a valve plate comprised of a semiconductor material and including a planar base with an extending pedestal positioned on an upper surface thereof, said pedestal having a valve surface, said planar base including a rim and a valve recess formed between said rim and said pedestal;

a cover plate sealed to said rim, including an inlet for communicating with said reservoir, said inlet sealable by engagement with said valve surface of said pedestal, said valve plate normally maintaining said valve surface out of engagement with said inlet, said cover plate further including an exhaust outlet in communication with said valve recess;

support plate means comprised of a semiconductor material and including a reference pressure enclosure in communication with said lower surface of said valve plate;

substrate means juxtaposed to a lower surface of said support plate means and including a pressure chamber;

an opening between said reference pressure enclosure and said pressure chamber;

valve means for receiving said compressible fluid from said pump and feeding said compressible fluid into said pressure chamber and, via said opening, into said reference pressure enclosure; and control means for (i) opening said valve means to enable establishment of a reference pressure in said reference pressure enclosure via said pressure chamber, said valve means opened at a time when said pump feed of said compressible fluid is at a high pressure, said high pressure in said reference pressure enclosure enabling said valve plate to cause said valve surface to seal said inlet, (ii) closing said valve means, and (iii) when it is desired to remove said fluid from said reservoir and when said pump feed is at a pressure that is less than said reference pressure, reopening said valve means to reduce said reference pressure, thereby allowing said valve plate and pedestal to move downwardly, and allowing fluid flow out of said reservoir through said inlet in said cover plate, into said valve recess and out said exhaust outlet.

11. A microvalve for feeding a compressible fluid from a pump to a reservoir, comprising:

a valve plate having a planar base and an extending pedestal, said pedestal having an upper valve surface, said planar base comprising a rim and a valve recess formed between said rim and said pedestal;

a cover plate having an inlet and an outlet, said cover plate sealed to said rim of said valve plate, said inlet communicating with said valve recess to enable feeding of a compressible fluid into said valve recess, said outlet sealed by engagement of the upper valve surface of said pedestal from said valve plate;

a support plate having a rim sealed to a lower surface of said valve plate, said support plate further comprising a reference pressure enclosure formed between said support plate, said lower surface of said valve plate, and said support plate rim; and a valve positioned in communication between said reference pressure enclosure and said inlet, wherein said valve is openable to enable establishment of a reference pressure in said reference pressure enclosure from said inlet, and thereafter, said valve is closable to seal off communication between said reference pressure enclosure and said inlet so that when pressure of said compressible fluid in said valve recess exceeds said reference pressure by a threshold level, said valve plate and said pedestal move downwardly, permitting fluid flow out of said valve recess and through said outlet in said cover plate, and further wherein said valve opens to enable re-establishment of a reference pressure equal to said pressure in said valve recess, thereby re-sealing said outlet by engagement of the upper valve surface of said pedestal before a next pump cycle.

12. A microvalve assembly comprising:

a valve plate including a valve surface and a valve recess;

a cover plate including an outlet for communicating with a reservoir, said outlet sealed by engagement with said valve surface of said valve plate;

a support plate including a reference pressure enclosure in communication with a lower surface of said valve plate;

a pressure chamber juxtaposed to a lower surface of said support plate;

means for feeding a compressible fluid from said pump into both said valve recess and said pressure chamber;

a valve positioned in communication between said reference pressure enclosure and said pressure chamber; and control means for (i) opening said valve to enable establishment of a reference pressure in said reference pressure enclosure from said pressure chamber, and (ii) thereafter closing said valve so that when pressure of said compressible fluid in said valve recess exceeds said reference pressure by a threshold level, said valve plate moves downwardly, allowing fluid flow out of said valve recess and through said outlet in said cover plate, and (iii) further opening said valve to enable reestablishment of said reference pressure in said reference pressure enclosure before a next pump cycle.

13. A microvalve for feeding a compressible fluid from a pump to a reservoir, comprising:

a valve plate having a planar base and an extending pedestal, said pedestal having an upper valve surface, said planar base comprising a rim and a valve recess formed between said rim and said pedestal;

a cover plate having an inlet and an outlet, said cover plate sealed to said rim, said inlet communicating with said valve recess to enable feeding of a compressible fluid into said valve recess, said outlet configured to communicate with said upper valve surface to substantially seal said outlet;

a support plate sealed to said valve plate, said support plate defining a reference pressure enclosure; and a valve positioned in communication between said reference pressure enclosure and said inlet, said valve openable to enable establishment of a reference pressure in said reference pressure enclosure from said inlet and closeable to seal off communication between said reference pressure enclosure and said inlet so that when pressure of said compressible fluid in said valve recess exceeds said reference pressure by a threshold level, said valve plate and said pedestal move downwardly, permitting fluid flow out of said valve recess and through said outlet in said cover plate.

14. The microvalve of claim 13 wherein said valve is further configured to open to enable re-establishment of a reference pressure equal to said pressure in said valve recess, thereby re-sealing said outlet by engagement of the upper valve surface of said pedestal before a next pump cycle.

15. The microvalve of claim 13 wherein said valve is positioned on a lower surface of said support plate within said reference pressure enclosure.

16. A microvalve assembly comprising:

a cover plate having an inlet and an outlet;

a valve plate including a valve surface and a valve recess, said valve surface engagable with said outlet;

a reference pressure enclosure in communication with a lower surface of said valve plate;

a pressure chamber juxtaposed to a lower surface of said reference pressure enclosure; and a valve positioned in communication between said reference pressure enclosure and said pressure chamber.

17. The microvalve assembly of claim 16 wherein said assembly further comprises a channel positioned in communication with said valve recess and said pressure chamber.

18. A microvalve for feeding a compressible fluid from a pump to a reservoir, comprising:

a valve plate having a base, a pedestal extending from said base, said pedestal having an upper valve surface, and a valve recess formed therein;

a cover plate having an inlet and an outlet, said cover plate being coupled to said valve plate, said inlet communicating with said valve recess to enable feeding of a compressible fluid into said valve recess, said outlet sealed by engagement of the upper valve surface of said pedestal;

a support plate coupled to a lower surface of said valve plate, said support plate further comprising a reference pressure enclosure formed between said support plate and said lower surface of said valve plate; and a valve positioned in communication between said reference pressure enclosure and said inlet, wherein said valve is openable to enable establishment of a reference pressure in said reference pressure enclosure from said inlet, and thereafter, said valve is closable to seal off communication between said reference pressure enclosure and said inlet so that when pressure of said compressible fluid in said valve recess exceeds said reference pressure by a threshold level, said valve plate and said pedestal separate from said outlet, permitting fluid flow out of said valve recess and through said outlet in said cover plate, and further wherein said valve opens to enable re-establishment of a reference pressure equal to said pressure in said valve recess, thereby re-sealing said outlet by engagement of the upper valve surface of said pedestal.

* * * * *